INVENTOR
J. H. FELKER
BY
H. A. Burgess
ATTORNEY

TRANSISTOR MEMORY CIRCUITS

Filed Nov. 19, 1951 5 Sheets-Sheet 2

INVENTOR
J. H. FELKER
BY H. A. Burgess
ATTORNEY

Aug. 21, 1956 J. H. FELKER 2,760,087

TRANSISTOR MEMORY CIRCUITS

Filed Nov. 19, 1951 5 Sheets-Sheet 3

INVENTOR
J. H. FELKER
BY H. A. Burgess
ATTORNEY

Aug. 21, 1956 J. H. FELKER 2,760,087

TRANSISTOR MEMORY CIRCUITS

Filed Nov. 19, 1951 5 Sheets-Sheet 4

INVENTOR
J. H. FELKER
BY H. A. Burgess
ATTORNEY

INVENTOR
J. H. FELKER
BY
H. A. Burgess
ATTORNEY

United States Patent Office 2,760,087

Patented Aug. 21, 1956

2,760,087

TRANSISTOR MEMORY CIRCUITS

Jean H. Felker, Livingston, N. J., assignor to Bell Telephone Laboratories, Incorporated, New York, N. Y., a corporation of New York Application November 19, 1951, Serial No. 257,097

18 Claims. (Cl. 307—88.5)

This invention relates generally to the storage of information in the form of electrical pulses and more particularly, although not exclusively, to the storage of binary bits of information in high-speed digital computers.

In digital computers and other high-speed switching systems, it is often necessary or desirable to store, at least temporarily, binary bits of information in the form of electrical pulses. In general, the information to be stored takes the form of either a "One" or a "Zero," i. e., a pulse or no pulse. In the past, memory of this type has usually been provided either through the use of pulse recirculation systems using delay lines or through the use of bi-stable or flip-flop circuits. However, while such arrangements are satisfactory for many purposes, they do possess certain handicaps. For example, systems employing delay lines tend to be bulky, and flip-flop circuits are often more difficult to trigger to one state than to the other.

One object of the present invention is, therefore, to store either a One or a Zero equally well and with the same sensitivity to a change in either direction.

Another object is to reduce the size of binary information storage circuits and pulse delay systems.

In a principal aspect, the present invention takes the form of a bit storage cell which uses no delay lines but still is capable of storing both types of information equally well. A non-inverting regenerative pulse amplifier is provided with a network which permits the amplifier to be retriggered one digit time after the termination of the last generated pulse. Thus, a pulse signifying a One is recirculated, appearing at the amplifier output once each digit time until an inhibiting pulse, signifying a Zero, is applied to the amplifier input in phase opposition to the One pulse. The output then remains zero until another One pulse is applied.

In one important embodiment of the invention, the retriggering network comprises means to invert the amplifier output pulse and pass it to a parallel tuned circuit and a rectifier connected to select the portion of the tuned circuit output of the same polarity as the One pulse and apply it to the amplifier input. In another important embodiment, the retriggering network takes the form of a capacitor which is charged through a rectifier from the amplifier output and is discharged through a resistor in the amplifier input. In this latter embodiment, a regular succession of pulses is fed to the amplifier input to prevent the charge on the capacitor from retriggering the amplifier until one digit time after the termination of an amplifier output pulse.

As an essential element of the combination, many embodiments of the invention feature the regenerative transistor pulse amplifier disclosed and claimed in applicant's copending application, Serial No. 255,043, filed November 6, 1951 now United States Patent No. 2,670,445, issued February 23, 1954. That amplifier comprises a single-transistor flip-flop circuit which is triggered to its high current state by signal pulses applied to the transistor emitter and is reset to its low current state by a regular succession of pulses fed to the transistor base. The latter succession of pulses also serves to regulate and standardize the amplifier output pulses by preventing the amplifier from being triggered to its high current state except during rigidly specified intervals. Embodiments of the invention featuring this amplifier are particularly suited for use in connection with basic pulse repetition rates of a megacycle or more and possess a very high degree of accuracy.

In another principal aspect, the invention takes the form of a compact pulse delay system which may be used in place of delay lines where relatively long delays are required and delay lines themselves are too bulky. A plurality of non-inverting regenerative pulse amplifiers are coupled in tandem transmission relation, with networks similar to those used to retrigger the amplifiers in the bit storage cell embodiments of the invention connected between amplifiers. In this manner, each successive amplifier is triggered one digit time after the termination of the pulse generated by the next preceding amplifier, and the total delay provided is governed by the number of amplifiers used. In other words, each stage of the system stores the transmitted pulse one digit time.

In one pulse delay system embodying the invention, the network between each pair of successive amplifiers comprises means to invert the output pulse produced by the first amplifier and pass it to a parallel tuned circuit and a rectifier connected to select the portion of the tuned circuit output of the same polarity as the amplifier output pulse and apply it to the input of the second amplifier. In a number of other pulse delay systems embodying the invention, the inter-amplifier network comprises a capacitor which is charged through a rectifier from the first amplifier output and is discharged through a resistor in the second amplifier input. In these latter embodiments, a regular succession of pulses is fed to each amplifier input to prevent the charge on the capacitor from triggering the second amplifier until one digit time after the termination of the pulse produced by the first amplifier.

A more thorough understanding of the invention may be obtained by a study of the following detailed description. In the drawings.

Figure 1:
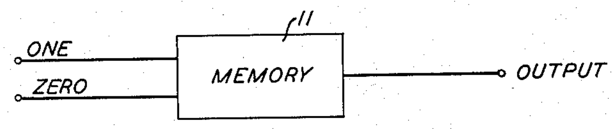
Fig. 1 is a block diagram of the pulse-type memory circuit in its simplest form.

The simplified memory circuit appearing in Fig. 1 is shown as a box 11 with one output terminal and two input terminals, one labeled "One" and the other labeled "Zero." This device has the property that if a pulse is put on the One terminal, a One pulse will be regenerated continuously at the output until a pulse is put on the Zero terminal, in which case the output will be zero and remain zero indefinitely until a new pulse is put on the One terminal. Thus, the output of the device is a train of pulses occurring at the basic pulse repetition rate when a One is stored and when a Zero is stored there is no output at all.

Figure 2:
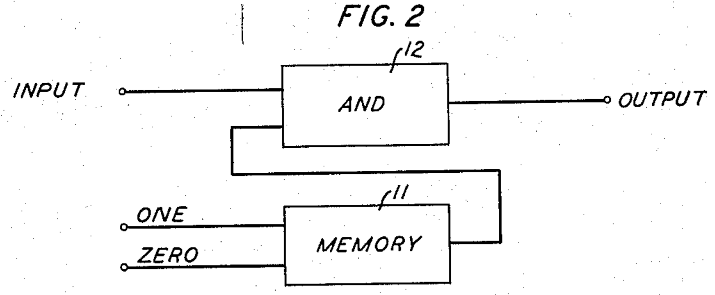
Fig. 2 is a block diagram of a circuit equivalent to a single-pole switch which makes use of a pulse-type memory circuit.

A typical use for this type of storage is shown in Fig. 2, where the mechanization of a single-pole switch is given. A so-called And circuit 12 has two input terminals and a single output terminal. One input terminal serves as the signal input terminal for the system, while the output terminal of memory circuit 11 is connected to the other. The input terminals of box 11 are, as before, labeled One and Zero. In the digital computer field, an And circuit is understood to be a network which passes a pulse whenever pulses are applied simultaneously to all of its input terminals, while an Or circuit is one which passes a pulse whenever one is applied to any one or more of its input terminals. As indicated, box 12 represents an And type of network.

In Fig. 2, if a pulse is fed to the One terminal of memory circuit 11, the single-pole switch to which the system is equivalent will be closed, and whatever data is put on the input to the switch will appear at the output. If, on the other hand, a pulse is put on the Zero terminal of memory circuit 11, memory circuit 11 will have no output thereafter, and the switch will be opened because the And circuit cannot respond to the signal on its input terminal.

Figure 3:
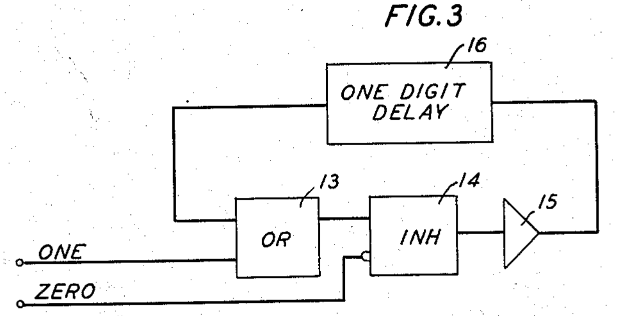
Fig. 3 is a block diagram of a pulse circulation type of memory circuit using a delay line.

An example of this type of storage is shown in Fig. 3. There, the memory device comprises a double input Or circuit 13, an inhibitor circuit 14, a non-inverting regenerative pulse amplifier 15, and a one-digit delay line 16. Inhibitor circuit 14 is a double-input And circuit with some such phase-reversal means as an inverting transformer coupled to one input. These four elements are connected in tandem transmission relation in the order named, with the output of Or circuit 13 connected to the non-inverting input of inhibitor circuit 14 and with delay line 16 coupling the output of amplifier 15 back to one of the inputs of Or circuit 13. The One terminal is the other Or circuit input terminal, while the Zero terminal is the other input of Or circuit 14. If a pulse is put on the One terminal of the device, it will go into amplifier 15 through Or circuit 13 and inhibitor circuit 14, and will appear as an amplified pulse at the output of the amplifier. This pulse will travel back through the one-digit delay line into the amplifier and continue to recirculate indefinitely, appearing once every digit period at the output of the amplifier. Inhibitor circuit 14 is put in series with the circulating path so that if a pulse is put on the Zero or inverting lead, it will prevent the output of the delay line from getting back into the amplifier. Output pulses may be taken from the output side of amplifier 15. However, the system shown in Fig. 3 requires a one-digit delay line, i. e., one which will delay an impressed pulse one pulse length, and if this is made out of the delay line materials now available, it will be a very bulky component.

Figure 4:
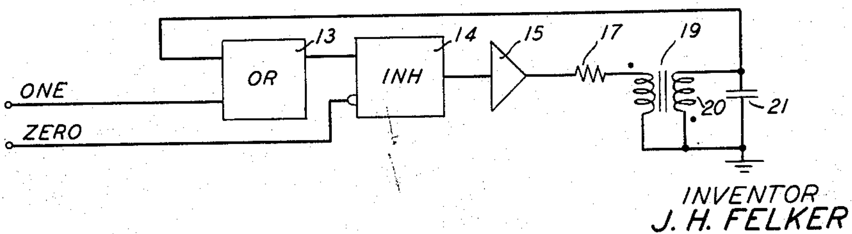
Fig. 4 is a block diagram of a pulse circulation type of memory circuit embodying the present invention.

In accordance with an important feature of the present invention, a delay line is not required in a memory circuit of this type. A block diagram of one bit storage cell embodying the invention is shown in Fig. 4. The Or circuit 13, the inhibitor circuit 14, and the non-inverting regenerative amplifier 15 are substantially the same as in Fig. 3. However, the output of amplifier 15 is coupled through a resistor 17 to the primary winding 18 of an inverting transformer 19. The secondary winding 20 of transformer 19 is tuned by a condenser 21 to a frequency of the order of 20 per cent below the basic pulse repetition rate. Condenser 21 may be a separate element or, if it is adequate, may even be the stray shunt capacity of the winding and the associated circuits. Winding 20 is coupled directly to the second input terminal of Or circuit 13 to complete the circulatory path.

In the operation of the embodiment of the invention illustrated in Fig. 4, the output pulse of amplifier 15, which is normally a positive pulse, is inverted and made into a negative pulse, and this negative pulse is, in effect, applied across a parallel tuned circuit. The output pulse causes the parallel circuit to ring negative and then, after a delay, to ring positive. This positive ring is fed back to Or circuit 13 to retrigger the amplifier. To implement this scheme, a transformer is used to convert the positive amplifier output to a negative pulse, and the resonant circuit is combined with the transformer as shown. Series resistor 17 decouples transformer 19 from amplifier 15 and prevents the low output impedance of the amplifier from damping the transformer. This makes the latter a poor transformer but a good inductance and also prevents transformer 19 from loading down the amplifier appreciably.

Figure 5A:
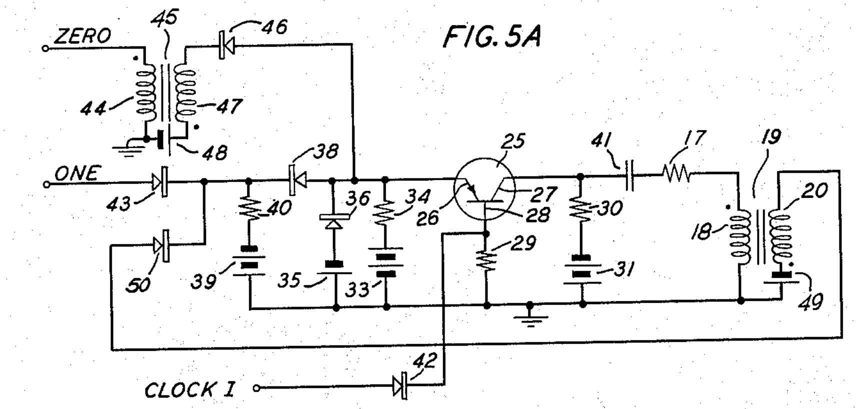
Fig. 5A is a schematic diagram of a transistor bit storage cell corresponding to the block diagram of Fig. 4.

Fig. 5A corresponds to the block diagram of Fig. 4 and is a schematic diagram of one transistor bit storage cell embodying the invention which is suitable for high-speed digital computer use. The regenerative transitor pulse amplifier shown forms the basis for applicant's previously noted copending application. In the circuit shown, the transistor 25 possesses an emitter electrode 26, a collector electrode 27, and a base electrode 28. In the conventional symbol, the emitter is indicated by the arrow, and the direction of positive emitter current flow is indicated by the direction of the arrow. Thus, a transistor having an n-type semiconductive body is indicated by symbol in which the emitter arrow points towards the base, while one having a p-type body is indicated by a symbol in which the emitter arrow points away from the base. For convenience, the conventional transistor symbol is shown here with the emitter arrow pointing toward the base, and all battery and rectifier polarities are chosen for the indicated direction of positive emitter current flow. The illustrated embodiment of the invention is not, however, limited to any particular type of transistor. For posiitve emitter current flow in the opposite direction, all battery and rectifier polarities are reversed from those shown.

In Fig. 5A, a base resistor 29 is connected between the base of transistor 25 and ground, while a load resistor 30 is returned from the collector to a negative voltage, conventionally represented by battery 31, which serves to bias the collector in the so-called reverse direction. The emitter is returned to a positive potential, represented by battery 33, through a "load-line" resistor 34, the resistance of which is large in comparison with the internal emitter impedance of transistor 25. In addition, the emitter is returned to a small negative potential, represented by battery 35, through a crystal diode 36 which is poled in the direction of positive emitter current flow. Signal pulses are applied to the emitter of transistor 25 through a crystal diode 38 which is poled oppositely to the direction of positive emitter current flow and the side of diode 38 away from the emitter is returned to a negative potential, represented by battery 39, through another large resistor 40. Output pulses may be taken from the collector through a coupling condenser 41.

The circuit which has thus far been described is actually a bi-stable or flip-flop circuit rather than an amplifier. As a pulse is applied through diode 38, the circuit is triggered from its low current to its high current state, where it remains. The circuit is made into an amplifier by applying a regular succession of positive pulses to the base of transistor 25. These pulses raise the base potential at regular intervals and cause the circuit to flip back to its low current state and are applied through a crystal diode 42 which is poled for easy current flow in the direction towards the base of transistor 25. In practice, a sine wave of a frequency substantially equal to the basic pulse repetition rate is applied to diode 42 to achieve the desired results. In addition to providing reset action, the base pulses serve to regulate and standardize the amplifier output pulses by preventing triggering to the high current state except during the intervals between pulses and terminating the output pulses promptly at the ends of such intervals. The wave applied to diode 42 is, therefore, termed a "clock" signal. The onset and the duration of the output pulses are determined by it rather than by the input pulses. For convenience in distinguishing the clock signal applied to the base of transistor 25 from another "clock" signal in subsequent figures, the clock terminal in Fig. 5A is labeled with an I.

In the transistor memory circuit shown in Fig. 5A, a crystal diode 43 poled in the direction of positive emitter current flow is connected between the One terminal and diode 38. The primary winding 44 of an inverting transformer 45 is connected between the Zero terminal and ground, while a crystal diode 46 poled oppositely to the direction of positive emitter current flow and the secondary winding 47 of transformer 45 are connected in series between the emitter and a positive potential, conventionally represented by a battery 48.

At the output end of the regenerative amplifier, resistor 17 and the primary winding 18 of inverting transformer 19 are connected in series between condenser 41 and ground. One side of the secondary winding 20 of transformer 19 is returned to a negative potential, represented by battery 49, and the other is connected to the junction between diodes 38 and 43 through a crystal diode 50. Like diode 43, diode 50 is poled in the direction of positive emitter current flow. Winding 20 is tuned to a frequency approximately 20 per cent below the basic pulse repetition rate by the shunt capacity presented by the rest of the circuit.

In Fig. 5A, diodes 43 and 50 correspond to Or circuit 13 in Fig. 4, while the network including transformer 45 and diodes 38 and 46 corresponds to inhibitor circuit 14. Assuming a basic pulse repetition rate and a clock frequency of one megacycle, when a One pulse is put into the One terminal of the memory circuit it fires transistor 25, causing the collector to go positive. The clock pulse at the base turns transistor 25 off half of a microsecond later. The pulse at the collector passes current into transformer 19 through resistor 17 and causes the transformer secondary inductance, together with the shunt capacity presented by the circuit, to ring. After the pulse at the collector has disappeared, the transformer secondary 20 rings positive and through diode 50 retriggers the transistor, providing that a Zero or inhibiting pulse has not been fed to transformer 45. The clock pulse at the base of transistor 25 insures that the transistor will not fire until the preceding digit period is finished. A Zero pulse fed to transformer 45 will be inverted and through diode 46 will hold the emitter negative, thereby preventing a stored pulse from recirculating.

In a typical memory circuit constructed according to the wiring diagram shown in Fig. 5A, transformers 19 and 45 are designed to pass a one-half microsecond pulse into a 470-ohm load. When operated from a high impedance generator and into a light load, the transformers ring at about one megacycle in response to a step pulse. For a one-megacycle basic pulse repetition rate and a one-megacycle clock frequency, other typical circuit parameter values are:

| | |
|---|---|
| Resistor 17 | 2000 ohms. |
| Resistor 29 | 470 ohms. |
| Resistor 30 | 470 ohms. |

| | |
|---|---|
| Battery 31 | −8 volts. |
| Battery 33 | +6 volts. |
| Resistor 34 | 22,000 ohms. |
| Battery 35 | −1 volt. |
| Battery 39 | −8 volts. |
| Resistor 40 | 12,000 ohms. |
| Condenser 41 | 0.01 microfarad. |
| Battery 48 | +2 volts. |
| Battery 49 | −1 volt. |

The various crystal diodes may, if desired, be any suitable asymmetrically conducting devices.

Figure 5B:
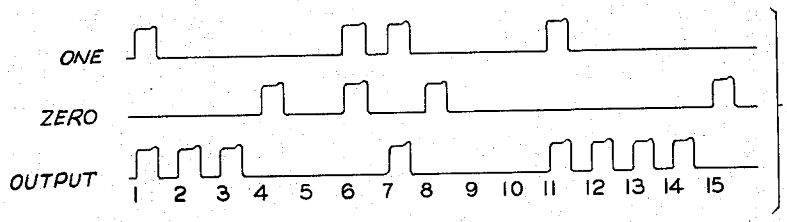
Fig. 5B illustrates some of the wave forms appearing in the circuit of Fig. 5A.

Fig. 5B shows typical wave forms for the memory circuit of Fig. 5A. Input pulses like those shown on the first two lines are applied to the One and Zero terminals, respectively, while pulses corresponding to those occurring on the third or bottom line appear at the collector of transistor 25. Each pulse is substantially half of a microsecond in length, and the interval between adjacent pulses is substantially half of a microsecond when successive pulses exist. In the example shown in Fig. 5B, a One is stored in the memory device at time 1. Four microseconds later a pulse is put on the Zero terminal which empties the storage cell. At time 6 another pulse appears on terminal One but does not get through the amplifier because at the same time a pulse is received on the Zero terminal. The pulse at time 7 goes through the amplifier but does not recirculate because at time 8 a pulse is put on the Zero lead. The output of the device is zero until time 11 when another pulse appears on the One terminal. This pulse is stored for four digit periods until another pulse is put on the Zero terminal to empty the cell.

The regenerative amplifier featured by the present invention is, as has been pointed out, itself a bi-stable device and is only made to operate as an amplifier by being turned off every digit time by a clock pulse. A memory circuit embodying the present invention has, however, numerous advantages over one merely using the bi-stable or flip-flop circuit itself for storage. The bi-stable transistor circuit can be turned on quite easily, since the emitter represents a high impedance when the transistor is in the low current state. However, once the transistor is locked up in the high current state, both the emitter and base terminals present very low impedances, and it takes considerable current to shut off the device. In an all transistor computer or switching circuit utilizing memory circuits embodying the invention, it is not necessary to turn off one transistor by another. Transistors are used only to turn on one another, and shut-off pulses are developed from a clock source. Since the clock signal represents steady-state power, it may be generated efficiently. If the bi-stable transistor circuit were to be used as the memory circuit, it would be left locked up in its high current state until it was desired to store a Zero, and a transistor somewhere in the computer or switching system would have to develop considerable current to shut off the transistor at that time. In the embodiment of the invention shown in Fig. 5A, it is no more difficult to store a Zero than a One because the storage of a Zero only requires that a positive pulse be applied to transformer 45. Transformer 45 converts the pulse to a negative pulse, causing diode 46 to conduct. It is only necessary for diode 46 to carry slightly more than a quarter of a milliampere to prevent the transistor circuit from firing. A principal advantage of the circuit can be seen, therefore, to lie in the fact that it can be made to store a One or a Zero equally well, and the sensitivity to a change in either direction is the same.

Figure 6:
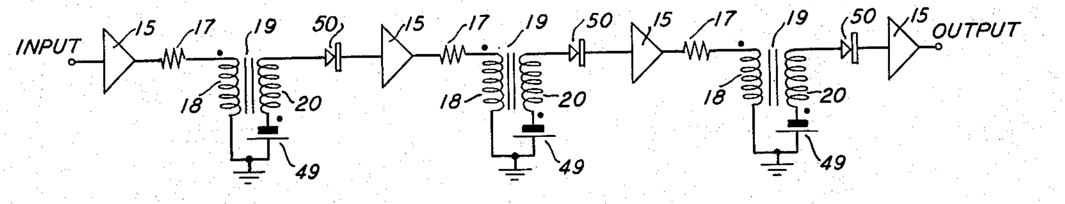
Fig. 6 is a combination block and schematic diagram of a pulse delay system embodying the invention.

Embodiments of the present invention also make useful delay elements where only one digit of delay is required. In Fig. 6, a chain of non-inverting amplifiers 15 are connected to one another through respective ringing transformers 19 to provide longer delay. As in Fig. 5A, a resistor 17 is connected between the output of each regenerative amplifier 15 and the primary winding 18 of corresponding transformer 19, and a rectifier 50 which is poled to select pulses of the polarity of the signal input pulses is connected to one side of the appropriate tuned transformer secondary 20. A negative potential source, represented by battery 49, is connected between the other side of each secondary winding and ground, and each rectifier supplies pulses to the next amplifier. If an input pulse is put into the first amplifier, it will appear at the second amplifier at time 2, at the third amplifier at time 3, and so on. Any number of amplifiers can be connected together to secure a desired delay. Such a system may be used as a substitute for delay lines where long delays are required and delay lines themselves are too bulky.

Figure 7:
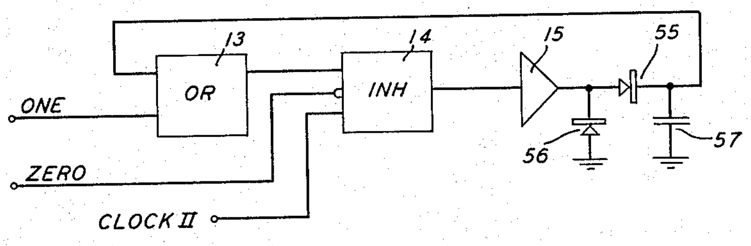
Fig. 7 is a block diagram of another pulse circulation type of memory circuit embodying the invention.

A block diagram of another bit storage cell embodying the present invention is shown in Fig. 7. The illustrated circuit is substantially the same as the one shown in Fig. 4, except that inhibitor circuit 14 is provided with one more non-inverting input, and the output of amplifier 15 is coupled back to Or circuit 13 through a network comprising a pair of crystal diodes 55 and 56 and a capacitor 57. Diode 55 is connected in series between amplifier 15 and Or circuit 13 and is poled for easy current flow in the direction from the former to the latter. Diode 56 is connected between the output side of amplifier 15 and ground and is poled for easy current flow from ground toward diode 55. Condenser 57 is connected between the side of diode 55 away from amplifier 15 and ground.

In the operation of the embodiment of the invention shown in Fig. 7 the, positive output pulse produced by non-inverting amplifier 15 applies a positive charge to condenser 57. When the amplifier output pulse is terminated, diodes 55 and 56 prevent condenser 57 from discharging through them and cause it to discharge into the input resistance of amplifier 15. This input resistance and the capacity of condenser 57 are chosen so that there will still be some charge left on condenser 57 one digit time after the termination of the previous amplifier output pulse. A regular succession of "clock" pulses is applied to the extra terminal of And circuit 14 to prevent the charge on condenser 57 from retriggering amplifier 15 until one digit time after the termination of the previous amplifier output pulse. To distinguish it from the clock terminal in Fig. 5A, the terminal for the application of clock pulses in Fig. 7 is labeled with a II.

In this manner, the circuit illustrated in Fig. 7 rectifies each output pulse of amplifier 15 and holds it as a bias so that the amplifier will continue to put out pulses until a Zero or inhibiting pulse is received. Then storage condenser 57 will discharge, and there will be no output until a new pulse is applied to the One terminal.

Figure 8A:
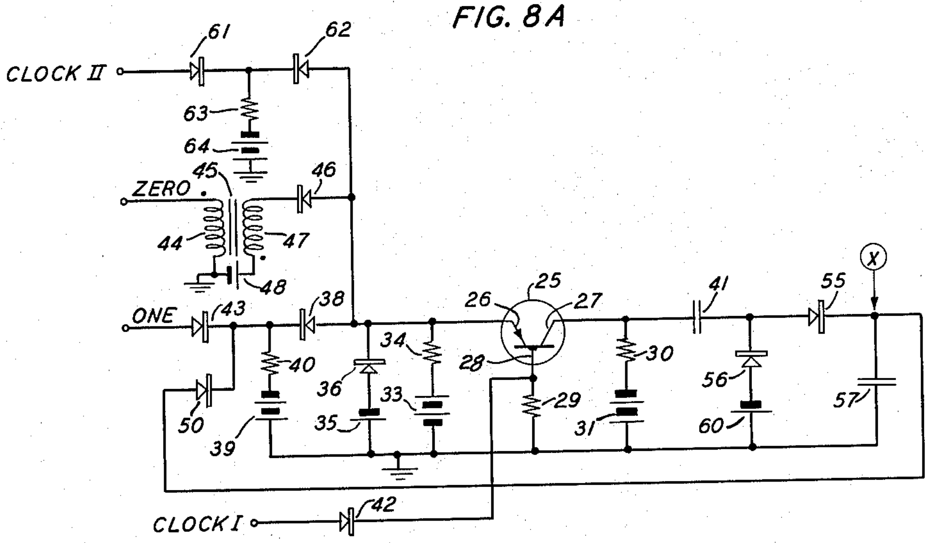
Fig. 8A is a schematic diagram of a transistor bit storage cell corresponding to the block diagram of Fig. 7.

Fig. 8A is a schematic diagram of another transistor bit storage cell embodying the invention which is suitable for high-speed digital computer use. The circuit shown corresponds to the block diagram of Fig. 7 and is substantially the same as that illustrated in Fig. 5A except that resistor 17, transformer 19, and battery 49 are replaced by the diode-condenser network shown in Fig. 7. Crystal diode 55 is poled in the direction of positive collector current flow and is connected in series between coupling condenser 41 and crystal diode 50. Diode 56 is poled for easy current flow from ground toward the junction between condenser 41 and diode 55 and is returned from that junction to a small negative potential, conventionally represented by a battery 60. Storage condenser 57 is returned to ground from the junction between crystal diodes 50 and 55. As in the block diagram in Fig. 7, a clock terminal is provided in the circuit of Fig. 8A for the application of a regular succession of pulses to prevent premature triggering the transistor amplifier. It is, as has been pointed out, labeled with a II to distinguish it from the terminal to which the amplifier reset pulses are applied. As in Fig. 5A, the latter terminal is labeled with an I.

The "clock II" terminal is connected through a pair of series crystal diodes 61 and 62 to the emitter electrode of transistor 25. The first diode 61 is poled in the direction of positive emitter current flow, while the second diode 62 is poled in the opposite direction. From the junction between diodes 61 and 62, a resistor 63 is returned to a negative potential, conventionally represented by a battery 64. The signal applied to the "clock II" terminal may be substantially a sine wave and is of the same frequency as that applied to the "clock I" terminal. The two clock signals are, however, opposite in phase. The network comprising transformer 45 and diodes 38, 46, and 62 corresponds to inhibitor circuit 14 in Fig. 7.

Figure 8B:
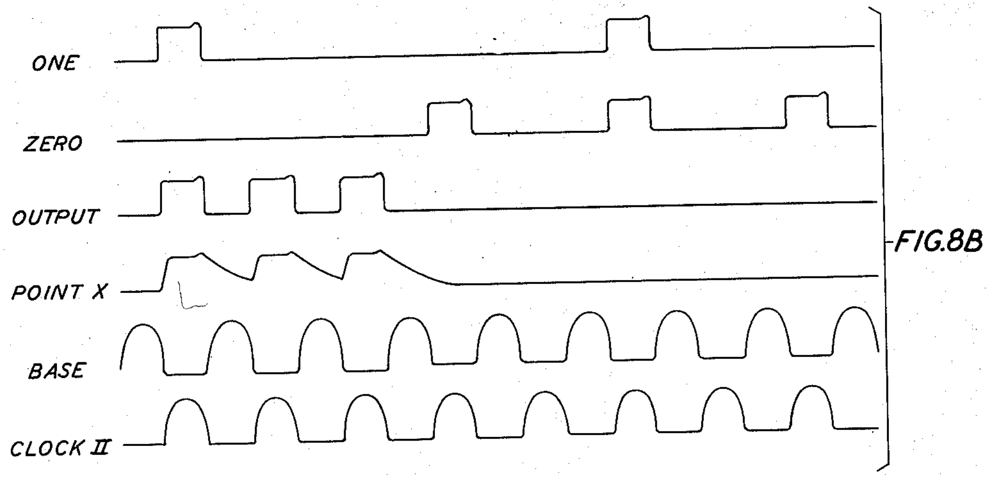
Fig. 8B illustrates some of the wave forms appearing in the circuit of Fig. 8A.

The operation of the embodiment of the invention shown in Fig. 8A may best be explained in connection with wave forms illustrated in Fig. 8B. The first and second lines show pulses which may, by way of example, be applied to the One and Zero terminals of the bit storage cell, respectively. The third line represents output pulses derived at the collector of transistor 25 which are produced for the illustrated combination of One and Zero pulses. The fourth line illustrates the wave form appearing at point "X," the ungrounded side of condenser 57, the fifth line illustrates that appearing at the base electrode of transistor 25, and the bottom line represents the clock pulses applied through diode 61.

As shown, the flip-flop circuit is triggered to its high current state by a pulse on the One terminal, and condenser 57 receives a positive charge through diode 55. The positive base pulse returns the flip-flop circuit to its low current state, terminating the output pulse, but diodes 55 and 56 prevent condenser 57 from discharging backwards into the amplifier. Therefore, at the end of the pulse, condenser 57 discharges only through diode 50 and resistor 40 in the input circuit of the amplifier. The magnitudes of condenser 57 and resistor 40 are chosen so that enough charge is left on condenser 57 one digit time later to retrigger the flip-flop circuit to its high current state. Premature triggering is prevented by the "clock I" pulse at the transistor base and by the current flowing through diodes 36 and 62 and resistor 63. The appearance of a pulse on the "clock II" terminal cuts off this latter current, permitting the emitter voltage to rise.

When the amplifier formed by the flip-flop circuit and the source of base or reset pulses is retriggered, the cycle repeats, and pulses are generated at the collector electrode at the basic pulse repetition rate until a Zero pulse is applied to the Zero terminal. A Zero pulse prevents the triggering clock pulse and the charge left on condenser 57 from retriggering the amplifier and the charge continues to decay. By the time the Zero pulse disappears, there is no longer enough bias at the input of the amplifier to cause triggering. The output at the transistor collector then remains Zero until another One pulse is applied. This assumes, of course, that a Zero pulse is not applied at the same instant as the One pulse, for there would then be no output either. A Zero pulse applied when no output pulses are being generated has no effect, the output of the device remaining zero.

Diode 56, in addition to preventing condenser 57 from discharging in the wrong direction, also serves as a direct-current restorer. Coupling condenser 41 is charged through the high impedance path presented by storage condenser 57 but is discharged through the low impedance path provided by diode 56. In this manner, coupling condenser 41 is permitted to discharge completely upon termination of a pulse, and the next pulse applied to storage condenser 57 is made to start at the same direct voltage level as the last one.

In a typical bit storage cell constructed according to the wiring diagram shown in Fig. 8A, for a one-megacycle basic pulse repetition rate, the following circuit parameters may be used:

| | |
|---|---|
| Resistor 29 | 470 ohms. |
| Resistor 30 | 470 ohms. |
| Battery 31 | —8 volts. |
| Battery 33 | +6 volts. |
| Resistor 34 | 22,000 ohms. |
| Battery 35 | —1 volt. |
| Battery 39 | —8 volts. |
| Resistor 40 | 12,000 ohms. |
| Condenser 41 | 0.01 microfarad. |
| Battery 48 | +2 volts. |
| Condenser 57 | 200 micromicrofarads. |
| Battery 60 | —2 volts. |
| Resistor 63 | 12,000 ohms. |
| Battery 64 | —8 volts. |

The "clock I" and "clock II" signals both have a frequency of one megacycle and are 180 degrees out of phase. The various crystal diodes are, as in other embodiments of the invention, any suitable asymmetrically conducting devices. The value given for storage condenser 57 is approximate and may require adjustment in any given installation.

Figure 9:
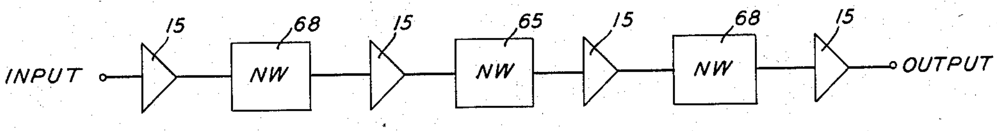
Fig. 9 is a generalized block diagram of a pulse delay system.

As an aid in explaining several other pulse delay systems embodying the invention, a block diagram of a generalized delay system using a regenerative pulse amplifier is shown in Fig. 9. Although any desired number of amplifiers may be used, four are shown and are connected in tandem transmission relation. A network 68 is connected in series between each amplifier 15 to complete the system. The first amplifier is fired by an input pulse, the second is fired one digit time after the termination of the output pulse of the first, the third is fired one digit time after the termination of the output pulse of the second, and so on. The network 68 may take the form of the resistor and inverting transformer combination shown in Fig. 6 or may take the form of the condenser-diode network used to retrigger the amplifier in the bit storage cells of Figs. 7 and 8A.

Figure 10A:
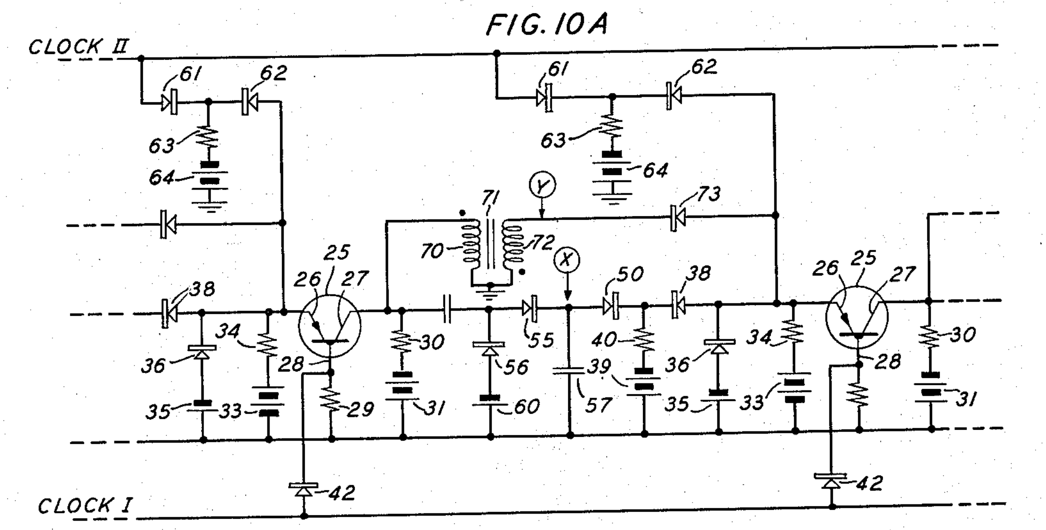
Fig. 10A is a schematic diagram of a section of another pulse delay system embodying the invention.

A section of another pulse delay system embodying the invention is shown in Fig. 10A. The system shown amounts to a number of bit storage cells like that of Fig. 8A connected end to end with each one connected to trigger the next rather than to retrigger itself. Thus, diode 50 in one circuit is connected to supply a pulse to diode 38 of the next. Two transistors 25 appear in the section shown in Fig. 10A. The respective clock signals are applied to both in the same manner that they are applied in Fig. 8A.

One of the problems encountered in connecting a chain of regenerative transistor amplifiers together in a pulse delay system in the manner shown in Fig. 10A is to prevent one stage from firing at the same instant that the next previous one does. In Fig. 6, it will be noted, the problem does not arise, since no signal appears at the input of the second amplifier until the pulse produced by the first amplifier has been terminated. In Fig. 10A, on the other hand, the charge on condenser 57 will be enough to trigger the second amplifier immediately unless some precaution is taken.

In accordance with another feature of the invention, the primary winding 70 of an inverting transformer 71 is connected between the collector of the first transistor 25 and ground. The secondary winding 72 of transformer 71 and a crystal diode 73 are connected in series between ground and the emitter of the second transistor 25, with diode 73 poled oppositely to the direction of positive emitter current flow. Transformer 71 inverts the pulse appearing at the collector of the first transistor and applies it to the emitter of the second in phase opposition to the voltages tending to trigger the latter. In this manner, triggering of the second amplifier is inhibited until the pulse produced by the first has been terminated. One digit time later, at the conclusion of the next clock pulse at the base of the second transistor, triggering can and does occur.

Figure 10B:
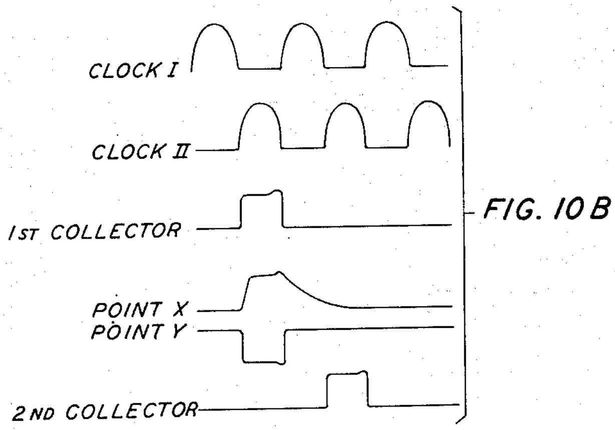
Fig. 10B illustrates some of the wave forms appearing in the circuit of Fig. 10A.

The operation of the pulse delay chain shown in Fig. 10A is illustrated by the wave forms shown in Fig. 10B. As indicated, the first and second lines illustrate the base or reset clock pulses and the triggering clock pulses, respectively. The third line illustrates the output pulse at the collector of the first transistor 25, the fourth line illustrates the wave form appearing at point X, the ungrounded side of storage condenser 57, and the fifth line illustrates that appearing at point Y, the ungrounded side of winding 72. The bottom line illustrates the output pulse at the collector of the second transistor 25.

Figure 11A:
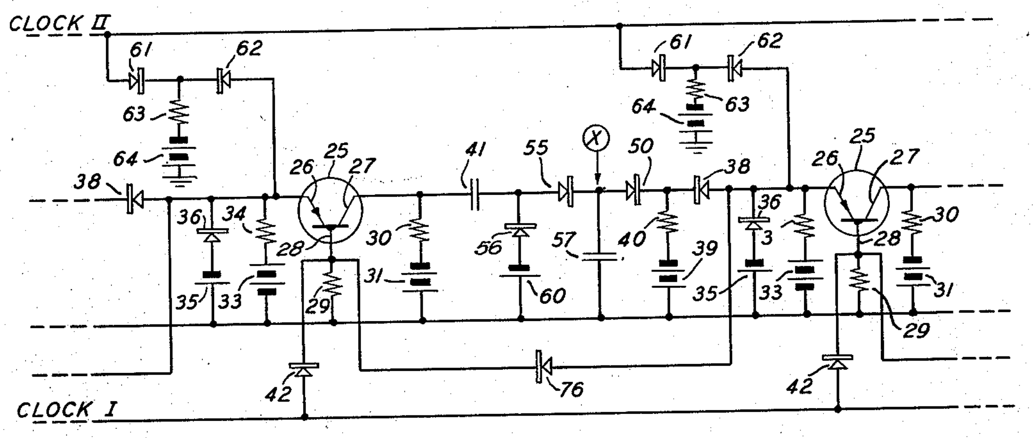
Fig. 11A is a schematic diagram of a section of still another pulse delay system embodying the invention.

A schematic diagram of a section of still another pulse delay system embodying the invention is shown in Fig. 11A. The circuit is the same as that of Fig. 10A except that a different means is provided for inhibiting the second amplifier during the generation of a pulse by the first amplifier. Transformer 71 is eliminated and, instead, a crystal diode 76 is connected between the base electrode of the first transistor 25 and the emitter electrode of the second. Diode 76 is poled for easy current flow from the last-named electrode to the first-named. This feature of the invention makes use of the fact that as the first transistor conducts, its base goes negative. The resulting negative base pulse is applied to the emitter of the next transistor through diode 76 and is enough to prevent triggering of the second amplifier until after the pulse at the first collector has been terminated.

Figure 11B:
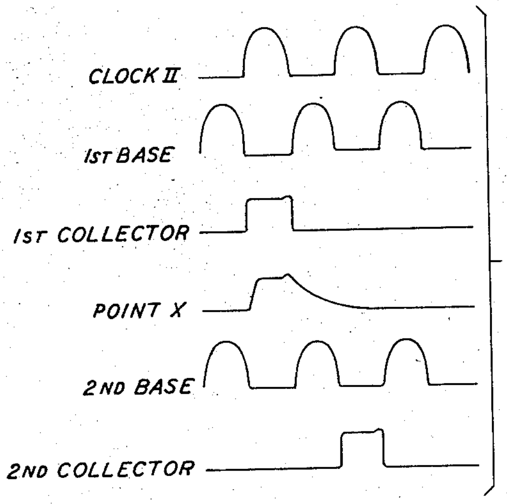
Fig. 11B illustrates some of the wave forms appearing in the circuit of Fig. 11A.

The operation of the pulse delay system shown in Fig. 11A is illustrated by the wave form shown in Fig. 11B. In Fig. 11B, the first line illustrates the triggering clock pulses, and the second illustrates the wave form at the base electrode of the first transistor 25. The latter includes the base or reset clock pulses and illustrates the negative excursion of the base during conduction. The third line shows the output pulse at the collector of the first transistor, the fourth shows the wave form at point X, the ungrounded side of condenser 57, and the fifth shows the wave form at the base of the second transistor. The pulse appearing at the collector of the second transistor is illustrated on the bottom line.

It is to be understood that the above-described arrangements are illustrative of the application of the principles of the invention. Numerous other arrangements may be devised by those skilled in the art without departing from the spirit and scope of the invention.

What is claimed is:

1. A circuit for the storage of a binary bit of information in the form of either a One or a Zero comprising a single-transistor flip-flop circuit, circuit means to supply signal pulses each signifying a One to the emitter electrode of the transistor to trigger said flip-flop circuit to its high current state, circuit means to supply a regular succession of pulses to the base electrode of the transistor to reset said flip-flop circuit to its low current state, circuit means to retrigger said flip-flop circuit automatically to its high current state one pulse length after it has been reset to its low current state, and circuit means to supply signal pulses each signifying a Zero to the emitter electrode of the transistor with a polarity opposite to that of the One pulses to inhibit the circulation thereof.

2. A circuit for the storage of a binary bit of information in the form of either a One or a Zero comprising a single-transistor flip-flop circuit, circuit means to supply signal pulses each signifying a One to the emitter electrode of the transistor to trigger said flip-flop circuit to its high current state, circuit means to supply a regular succession of pulses to the base electrode of the transistor to reset said flip-flop circuit to its low current state, means to retrigger said flip-flop circuit to its high current state one pulse length after it has been reset to its low current state comprising an inverting transformer, a parallel tuned circuit, an asymmetrically conducting device poled to pass pulses of the polarity of the signal pulses, and circuit means to apply the pulses passed by said asymmetrically conducting device to the emitter electrode of the transistor, and circuit means to supply signal pulses each signifying a Zero to the emitter electrode of the transistor with a polarity opposite to that of the One pulses to inhibit the circulation thereof.

3. A circuit for the storage of a binary bit of information in the form of either a One or a Zero comprising a single-transistor flip-flop circuit, circuit means to supply signal pulses each signifying a One to the emitter electrode of the transistor to trigger said flip-flop circuit to its high current state, circuit means to supply a regular succession of pulses to the base electrode of the transistor to reset said flip-flop circuit to its low current state, means to retrigger said flip-flop circuit to its high current state one pulse length after it has been reset to its low current state comprising an inverting transformer, the output winding of which is tuned to a frequency below the basic signal pulse repetition rate, an asymmetrically conducting device poled to pass pulses of the polarity of the signal pulses, and circuit means to apply the pulses passed by said asymmetrically conducting device to the emitter electrode of the transistor, and circuit means to supply signal pulses each signifying a Zero to the emitter electrode of the transistor with a polarity opposite to that of the One pulses to inhibit the circulation thereof.

4. A bit storage cell in accordance with claim 3 in which the frequency to which the output winding of said inverting transformer is tuned is substantially 20 per cent below the basic pulse repetition rate.

5. A circuit for the storage of a binary bit of information in the form of either a One or a Zero comprising a single-transistor flip-flop circuit, circuit means to supply signal pulses each signifying a One to the emitter electrode of the transistor to trigger said flip-flop circuit to its high current state, circuit means to supply a regular succession of pulses to the base electrode of the transistor to reset said flip-flop circuit to its low current state, means to retrigger said flip-flop circuit to its high current state one pulse length after it has been reset to its low current state comprising a storage capacitor, circuit means to charge said capacitor under the control of each output pulse produced by said flip-flop circuit, and circuit means to discharge said capacitor into an impedance element coupled to the emitter electrode of the transistor, and circuit means to supply signal pulses each signifying a Zero to the emitter electrode of the transistor with a polarity opposite to that of the One pulses to inhibit the circulation thereof.

6. A circuit for the storage of a binary bit of information in the form of either a One or a Zero comprising a single-transistor flip-flop circuit, circuit means to supply signal pulses each signifying a One to the emitter electrode of the transistor to trigger said flip-flop circuit to its high current state, circuit means to supply a regular succession of pulses to the base electrode of the transistor to reset said flip-flop circuit to its low current state, means to retrigger said flip-flop circuit to its high current state one pulse length after it has been reset to its low current state comprising a storage capacitor, an asymmetrically conducting device poled in the direction of positive collector current flow coupled between the collector electrode of the transistor and said capacitor to charge said capacitor under the control of each output pulse produced by said flip-flop circuit, and circuit means to discharge said capacitor into an impedance element coupled to the emitter electrode of the transistor, and circuit means to supply signal pulses each signifying a Zero to the emitter electrode of the transistor with a polarity opposite to that of the One pulses to inhibit the circulation thereof.

7. A bit storage cell in accordance with claim 6 which includes circuit means to supply a regular succession of pulses to the emitter electrode to prevent the charge on said storage capacitor from retriggering said flip-flop circuit to its high current state until one pulse length after said flip-flop circuit has been reset to its low current state.

8. A circuit for the storage of a binary bit of information in the form of either a One or a Zero comprising a non-inverting regenerative pulse amplifier which produces an output pulse whenever a triggering pulse signifying a One is applied to its input, circuit means to prevent said amplifier from producing an output pulse whenever a pulse signifying Zero is applied, and means to retrigger said amplifier one pulse length after the termination of each output pulse comprising an inverting transformer, a parallel tuned circuit, an asymmetrically conducting device poled to pass pulses of the polarity of the amplifier output pulses, and circuit means to apply the pulses passed by said asymmetrically conducting device to the input of said amplifier.

9. A circuit for the storage of a binary bit of information in the form of either a One or a Zero comprising a non-inverting regenerative pulse amplifier which produces an output pulse whenever a triggering pulse signifying a One is applied to its input, circuit means to prevent said amplifier from producing an output pulse whenever a pulse signifying a Zero is applied, and means to retrigger said amplifier one pulse length after the termination of each output pulse comprising an inverting transformer, the output winding of which is tuned to a frequency below the basic repetition rate of the One and Zero pulses, an asymmetrically conducting device poled to pass pulses of the polarity of the amplifier output pulses, and circuit means to apply the pulses passed by said asymmetrically conducting device to the input of said amplifier.

10. A circuit for the storage of a binary bit of information in the form of either a One or a Zero comprising a regenerative pulse amplifier which produces an output pulse whenever a triggering pulse signifying a One is applied to its input, circuit means to prevent said amplifier from producing an output pulse whenever a pulse signifying a Zero is applied, and means to retrigger said amplifier automatically one pulse length after the termination of each output pulse comprising a storage capacitor, circuit means to charge said capacitor under the control of each amplifier output pulse, and circuit means to discharge said capacitor into the amplifier input.

11. A circuit for the storage of a binary bit of information in the form of either a One or a Zero comprising a regenerative pulse amplifier which produces an output pulse whenever a triggering pulse signifying a One is applied to its input, circuit means to prevent said amplifier from producing an output pulse whenever a pulse signifying a Zero is applied, and means to retrigger said amplifier automatically one pulse length after the termination of each output pulse comprising a storage capacitor, an asymmetrically conducting device poled to pass amplifier output pulses coupled between the amplifier output and said capacitor to charge said capacitor under the control of each amplifier output pulse, and circuit means to discharge said capacitor into the amplifier input.

12. A pulse delay system which comprises at least two single-transistor flip-flop circuits, circuit means to supply signal pulses to the emitter electrode of the transistor of the first of said flip-flop circuits to trigger said first flip-flop circuit to its high current state, circuit means to supply the same regular succession of pulses to the base electrodes of the transistor of both of said flip-flop circuits to reset said flip-flop circuits to their low current states, and circuit means to trigger the second of said flip-flop circuits automatically to its high current state one pulse length after said first flip-flop circuit has been reset to its low current state.

13. A pulse delay system which comprises at least two single-transistor flip-flop circuits, circuit means to supply signal pulses to the emitter electrode of the transistor of the first of said flip-flop circuits to trigger said first flip-flop circuit to its high current state, circuit means to supply a regular succession of pulses to the base electrodes of the transistor of both of said flip-flop circuits to reset said flip-flop circuits to their low current states, and means to trigger the second of said flip-flop circuits to its high current state one pulse length after said first flip-flop circuit has been reset to its low current state comprising an inverting transformer, a parallel tuned circuit, an asymmetrically conducting device poled to pass pulses of the polarity of the output pulses of said first flip-flop circuit, and circuit means to apply the pulses passed by said asymmetrically conducting device to the emitter electrode of the transistor of said second flip-flop circuit.

14. A pulse delay system which comprises at least two single-transistor flip-flop circuits, circuit means to supply signal pulses to the emitter electrode of the transistor of the first of said flip-flop circuits to trigger said first flip-flop circuit to its high current state, circuit means to supply a regular succession of pulses to the base electrodes of the transistor of both of said flip-flop circuits to reset said flip-flop circuits to their low current states, and means to trigger the second of said flip-flop circuits to its high current state one pulse length after said first flip-flop circuit has been reset to its low current state comprising a storage capacitor, circuit means to charge said capacitor under the control of each output pulse produced by said first flip-flop circuit, and circuit means to discharge said capacitor into an impedance element coupled to the emitter electrode of the transistor of said second flip-flop circuit.

15. A pulse delay system in accordance with claim 12 which includes means to prevent said second flip-flop circuit from triggering to its high current state simultaneously with said first flip-flop circuit comprising an inverting transformer coupled between the collector electrode of the transistor of said first flip-flop circuit and the emitter electrode of the transistor of said second flip-flop circuit.

16. A pulse delay system in accordance with claim 12 which includes means to prevent said second flip-flop circuit from triggering to its high current state simultaneously with said first flip-flop circuit comprising an asymmetrical conducting device poled oppositely to the direction of positive emitter current flow in said second flip-flop circuit connected between the base electrode of the transistor of said first flip-flop circuit and the emitter electrode of the transistor of said second flip-flop circuit.

17. A pulse delay system which comprises at least two non-inverting regenerative pulse amplifiers each of which produces an output pulse whenever a triggering signal pulse is applied to its input circuit, means to supply signal pulses to the input of the first of said amplifiers, and means to trigger the second of said amplifiers one pulse length after the termination of the pulse produced by said first amplifier comprising an inverting transformer, a parallel tuned circuit, an asymmetrically conducting device poled to pass pulses of the polarity of the output pulses of said first amplifier, and circuit means to apply the pulses passed by said asymmetrically conducting device to the input of said second amplifier.

18. A pulse delay system which comprises at least two regenerative pulse amplifiers each of which produces an output pulse whenever a triggering signal pulse is applied to its input, circuit means to supply signal pulses to the input of the first of said amplifiers, bias means for inhibiting the triggering of the second of said amplifiers until the pulse produced by the first of said amplifiers has been terminated, and means to trigger the second of said amplifiers one pulse length after the termination of the pulse produced by said first amplifier comprising a storage capacitor, an asymmetrically conducting device poled to pass pulses of the polarity of the output pulses of said first amplifier, circuit means to charge said capacitor through said asymmetrically conducting device under the control of each output pulse produced by said first amplifier, whereby said asymmetrically conducting device prevents said capacitor from discharging backwards into said first amplifier, and circuit means to discharge said capacitor into the input of said second amplifier.

References Cited in the file of this patent

UNITED STATES PATENTS

| | | |
|---|---|---|
| 2,531,076 | Moore | Nov. 21, 1950 |
| 2,644,892 | Gehman | July 7, 1953 |
| 2,644,893 | Gehman | July 7, 1953 |
| 2,652,501 | Wilson | Sept. 15, 1953 |
| 2,706,247 | Jacobs et al. | Apr. 12, 1955 |